(12) United States Patent
Daniel

(10) Patent No.: US 8,140,359 B2
(45) Date of Patent: Mar. 20, 2012

(54) SYSTEM AND METHOD FOR DETERMINING AN OBJECTIVE DRIVER SCORE

(75) Inventor: Isaac Sayo Daniel, Miami, FL (US)

(73) Assignee: F3M3 Companies, Inc., Miramar, FL (US)

( * ) Notice: Subject to any disclaimer, the term of this patent is extended or adjusted under 35 U.S.C. 154(b) by 379 days.

(21) Appl. No.: 12/283,312

(22) Filed: Sep. 11, 2008

(65) Prior Publication Data
US 2010/0063850 A1    Mar. 11, 2010

(51) Int. Cl.
*G06Q 40/00*    (2012.01)
(52) U.S. Cl. ................................. 705/4; 705/35; 705/38
(58) Field of Classification Search ................ 705/4, 35, 705/38
See application file for complete search history.

(56) References Cited

U.S. PATENT DOCUMENTS

| | | | |
|---|---|---|---|
| 5,797,134 A | 8/1998 | McMillan | |
| 6,064,970 A | 5/2000 | McMillan | |
| 6,714,894 B1 * | 3/2004 | Tobey et al. | 702/188 |
| 2002/0111725 A1 * | 8/2002 | Burge | 701/29 |
| 2003/0182337 A1 * | 9/2003 | Wefers et al. | 708/490 |
| 2004/0153362 A1 * | 8/2004 | Bauer et al. | 705/10 |
| 2006/0253307 A1 * | 11/2006 | Warren et al. | 705/4 |
| 2010/0030586 A1 * | 2/2010 | Taylor et al. | 705/4 |

* cited by examiner

*Primary Examiner* — Lalita M Hamilton
(74) *Attorney, Agent, or Firm* — Carol N. Green, Esq.

(57) ABSTRACT

The present invention is directed to a business method in the field of automobile insurance, more specifically, a system and method of determining an objective driver score that may be used universally by independent insurers to evaluate the risk of insuring a driver by employing certain risk assessment factors concerning the driver's personal history which are each analyzed to derive weighted scores. Each driver is provided with a portable pin with an electronic key unique to the driver that is encoded for selective activation of a monitoring unit in a vehicle such that solely the activities of the driver being assessed is recorded and communicated to an evaluation center. Once activated, the monitoring unit records and generates the driver's risk assessment record based on the driver's operation of a vehicle equipped with the monitoring unit, as well as other variable parameters concerning operation of the vehicle. Said driver's risk assessment record is analyzed to derive a weighted driver risk assessment score that is aggregated with the individual weighted scores derived from the risk assessment factors to generate an objective driver score.

20 Claims, 4 Drawing Sheets

SYSTEM AND METHOD FOR DETERMINING AN OBJECTIVE DRIVER SCORE

FIELD OF THE INVENTION

The present invention is directed to a business method in the field of automobile insurance, more specifically, a system and method of determining an objective driver score that may be used universally by independent insurers to evaluate the risk of insuring a driver.

DESCRIPTION OF THE PRIOR ART

There are other systems and methods for determining the cost of insurance based upon monitoring and communicating data pertaining to how a driver operates a vehicle. For example, U.S. Pat. No. 5,797,134 issued to McMillan on Aug. 18, 1998.

U.S. Pat. No. 5,797,134

Inventor: Robert John McMillan

Issued: Aug. 18, 1998

A method and system of determining a cost of automobile insurance based upon monitoring, recording and communicating data representative of operator and vehicle driving characteristics. The cost is adjustable retrospectively and can be prospectively set by relating the driving characteristics to predetermined safety standards. The method comprises steps of monitoring a plurality of raw data elements representative of an operating state of the vehicle or an action of the operator. Selected ones of the raw data elements are recorded when the ones are determined to have an identified relationship to safety standards. The selected ones are consolidated for processing against an insurer profile and for identifying a surcharge or discount to be applied to a base cost of automobile insurance. A final cost is produced from the base costs and the surcharges or discounts.

Another patent, U.S. Pat. No. 6,064,970 was issued to McMillan on May 16, 2000.

U.S. Pat. No. 6,064,970

Inventor: Robert John McMillan

Issued: May 16, 2000

A method and system of determining a cost of automobile insurance based upon monitoring, recording and communicating data representative of operator and vehicle driving characteristics. The cost is adjustable retrospectively and can be prospectively set by relating the driving characteristics to predetermined safety standards. The method comprises steps of monitoring a plurality of raw data elements representative of an operating state of the vehicle or an action of the operator. Selected ones of the raw data elements are recorded when the ones are determined to have an identified relationship to safety standards. The selected ones are consolidated for processing against an insurer profile and for identifying a surcharge or discount to be applied to a base cost of automobile insurance. A final cost is produced from the base costs and the surcharges or discounts.

While these systems and methods may be suitable for the purposes for which they were designed, they would not be suitable for the purposes of the present invention hereinafter described. One of the limitations of the systems and methods of the prior art is that the monitoring sessions attempt to monitor a driver's operation of the vehicle, but there are no provisions for multiple drivers having access to, or operating the same vehicle during the monitoring sessions in a prescribed period. Specifically, there is no way to solely track the individual driver's operation of the monitored vehicle when the vehicle is shared among a plurality of drivers. The present invention overcomes the limitations of the prior art by providing an improved system and method for determining a driver score, which includes monitoring an individual driver's operation of a vehicle that is independent of a particular vehicle and therefore capable of concurrently monitoring a plurality of drivers of the same vehicle.

SUMMARY OF THE INVENTION

The present invention overcomes the limitations of the prior art by providing a system and method for determining an objective driver score that may be used universally by insurers and individuals alike to determine a driver's insurability.

An object of the present invention is to provide a simple, yet efficient method of uniformly evaluating the risks associated with insuring an individual driver.

Another object of the present invention is to have a system and method of including relevant personal historical data in determining a driver's insurability, where the personal historical data is kept confidential and used in a manner that is non-discriminating, while being fair to both the insurer and the insured.

Yet another object of the present invention is to provide an improved, reliable system and method for assessing the insurability of a driver based in part on the individual driver's operation of a vehicle during monitoring sessions for a prescribed period, even though a plurality of drivers may be operating the same vehicle during that period.

Another object of the present invention is to provide a driver with knowledge of the universal risk assessment factors being used to determine his or her insurability, such that the driver may take corrective steps if necessary, to improve his/her driver score.

Still another object of the invention is to allow individual drivers to improve their driver scores and optimize their ability to obtain preferred insurance rates from automobile insurers.

Yet another object of the invention is to allow insurers to minimize their risk in insuring automobile drivers based on an objective driver score, which encompasses information not previously taken into account or readily available in an objective format.

Another object of the present invention is to have an objective driver score that may be used by both the insurer and the insured to predict with some reliability beforehand the driver's qualifications for preferred insurance rates.

Accordingly, the present invention provides a system and method of determining an objective driver score by receiving a driver's personal history, which includes a plurality of risk assessment factors, wherein said risk assessment factors are each analyzed to derive individual weighted scores using a computer implemented algorithm, and wherein said individual weighted scores are each distinct from an objective driver score used to assess said driver's insurability. The driver's personal history may include but is not limited to any one or more of the following: name, age, sex, marital status, student status and/or any other personal historical data that may pertain to the driver's insurability. Similarly, the driver's risk assessment factors may include any one or more of the following: credit score, employment history, driving experience, social security number for verification purposes, the driving record, address history, insurance history, the number of outstanding tickets within a predetermined period, and/or any other determinative risk assessment factors pertaining to the driver's insurability.

Each driver being monitored is provided with a portable pin unit with a unique electronic key used as a unique identifier for the driver being assessed, which is registered in a database with an evaluation center. Each portable pin unit further comprises of means for selective activation of a monitoring unit in a vehicle to start a monitoring session, where upon activation the driver's operation of said vehicle and other pertinent data elements concerning the vehicle are recorded and reported to an evaluation center to generate a driver's risk assessment record. In this manner, solely the activities of the driver being assessed is recorded and transmitted to the evaluation center. Therefore, if a plurality of drivers is operating the same vehicle within the prescribed period, each driver's operation of the vehicle is individually assessed and the assessment is not solely dependent on that particular vehicle.

Alternatively, if a driver owns, has access to, or will be operating a plurality of vehicles during the monitoring sessions within the prescribed period, no additional portable pin unit is required. However, each vehicle being monitored, the primary and/or secondary, must be equipped with a monitoring unit in communications with a variety of different sensors within the vehicle to obtain information concerning the status of various safety features, and the driver's operation of the vehicle. Upon activation with the portable pin unit via its activation switch, the driver's operation of said vehicle and other pertinent data elements concerning the vehicle are monitored, recorded and transmitted by the monitoring unit to an evaluation center to generate said driver's risk assessment record. Said data elements may include but is not limited to any one or more of the following: information regarding the seatbelts, presence of air bags, state of the windshield wipers, etc. and/or any other vehicle safety features.

Said monitoring unit may be portable and able to communicate wirelessly with the varied sensors in a vehicle that is being monitored, which may obviate the need for registration of the vehicle. In an alternate embodiment, the monitoring unit is hard wired into the system of the vehicle which requires registration. According to one embodiment of the invention, the system may receive registration of at least one vehicle, a primary and/or any secondary vehicle, which said driver may operate during the monitoring sessions within the prescribed period, as well as any other variable parameters concerning vehicle operation for the monitoring sessions. Said variable parameters may include any one or more of the following: the title, vehicle registration and vehicle identification numbers for each secondary vehicle being registered, as well as the number of other drivers, names, addresses, ages, student status, sex(es) of each additional driver who has access to, or will be operating the vehicle.

The monitoring unit may transmit the driver's risk assessment record to the evaluation center in realtime or with minimal delay, e.g. 1-10 minutes. The evaluation center receives the driver's risk assessment record, which is analyzed to derive a weighted driver risk assessment score, wherein said weighted driver risk assessment score is distinct from the objective driver score. The system of the invention then determines and outputs the objective driver score, based on the aggregate of all individual weighted scores derived from the plurality of risk assessment factors and the driver's risk assessment record.

For purposes of illustration, in applying the within system and method of the invention, a driver may have scored a weighted credit score of 90 (out of 100), weighted employment history score of 85 (out of 100), weighted driving experience score of 48 (out of 50), weighted social security score of 50 (out of 50), weighted driving record score of 75 (out of 80), weighted address history score of 40 (out of 50), weighted insurance history score of 38 (out of 40), weighted accident history score of 45 (out of 50) and weighted driver's risk assessment score of 95 (out of 100) for an aggregate objective driver score of 566 out of a maximum of 600. In this example, the driver would be considered a responsible driver with high insurability with minimal risk of incurring an insurance claim.

For a further and more fully detailed understanding of the present invention, various objects and advantages thereof, reference is made to the following detailed description and the accompanying drawings.

BRIEF DESCRIPTION OF THE DRAWINGS

Further objectives and advantages of the present invention may be derived by referring to the detailed description and claims when considered in connection with the Figures, wherein like reference numbers refer to similar items throughout the Figures.

DESCRIPTION OF THE PREFERRED EMBODIMENTS

The present invention is now described in more detail by reference to the exemplary drawings in detail wherein like numerals indicate like elements throughout the various views. This is for convenience only and is not intended to limit the application of the present invention. In fact, after reading the following description, it will be apparent to one skilled in the relevant art(s) how to implement the following invention in alternate embodiments.

Figure 1:
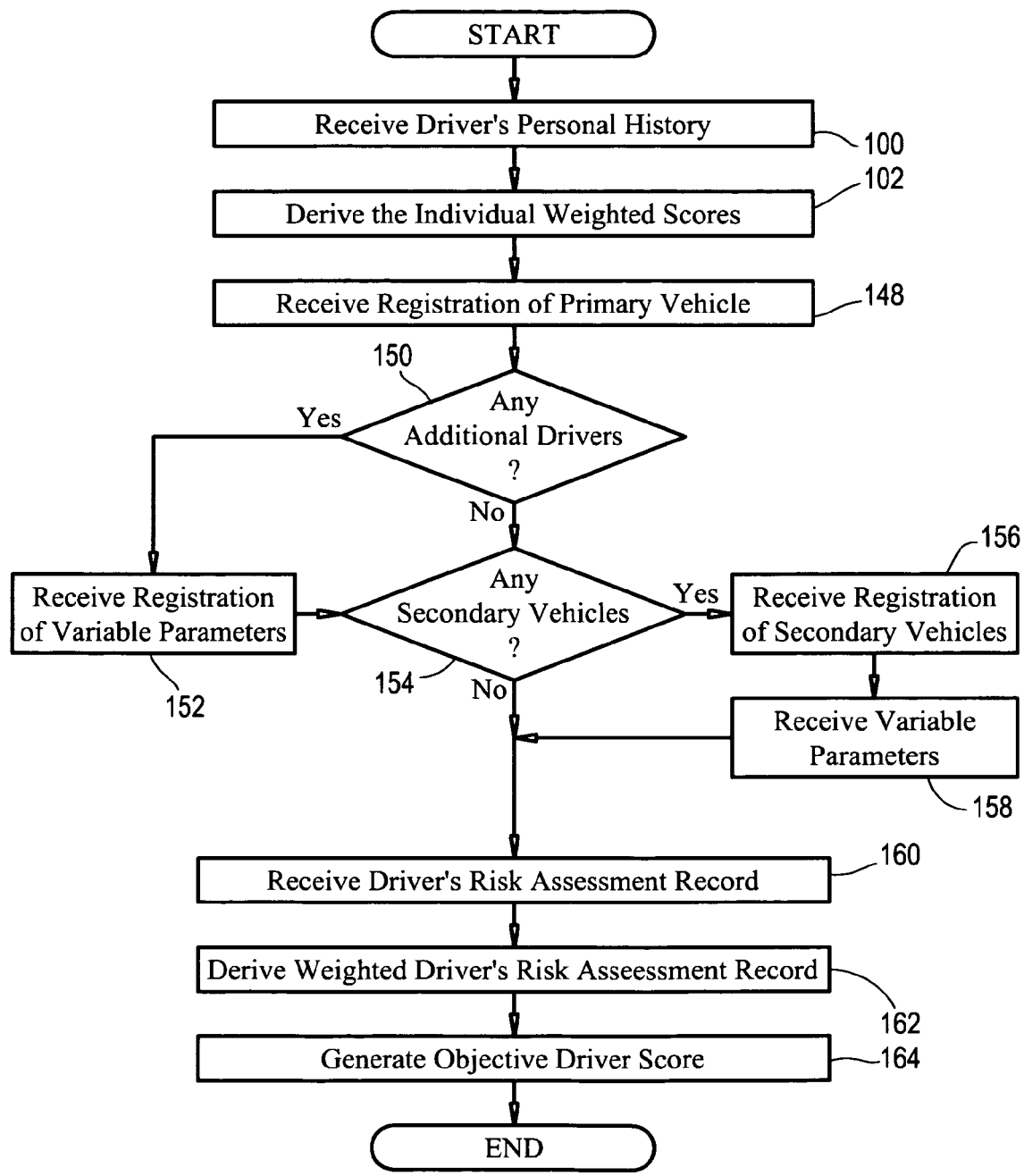
FIG. 1 is a sample flowchart of an exemplary method of determining a driver score according to an embodiment of the invention.

FIG. 1 is a sample flowchart of an exemplary method of determining a driver score 10 according to an embodiment of the invention. As seen in FIG. 1, the system 12 of the invention receives the driver's personal history 14 (step 100) in response to a series of questions posed to the driver, either verbally or visually. In the preferred embodiment, this method is performed over the Internet 256 (not shown) by viewing questions in a computer display 15 (not shown) and the driver providing responsive information. The driver's personal history 14 information may include but is not limited to: name, age, sex, marital status, and/or student status. Certain risk assessment factors 16 of the driver's personal history 14 are analyzed to derive individual weighted scores 18 using a computer implemented algorithm, wherein said individual weighted scores 18 are each distinct from an objective driver score 10 used to assess said driver's insurability.

Figure 1A:
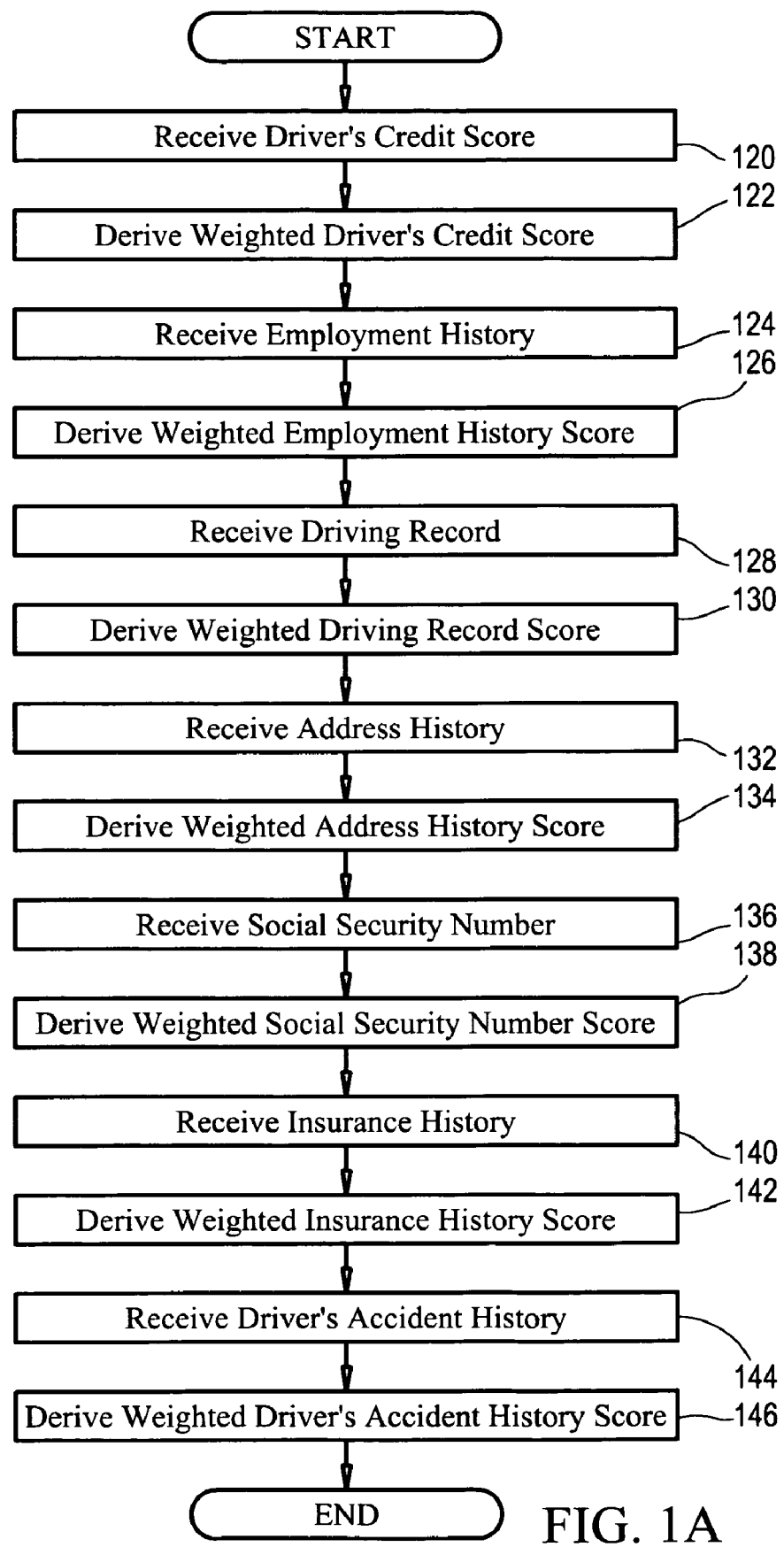
FIG. 1A is a sample flowchart of an exemplary method of deriving individual weighted scores based on the different risk assessment factors of the driver's personal history in accord with one embodiment of the invention.

Referring now to FIG. 1A, which is a sample flowchart of an exemplary method of deriving individual weighted scores 18 (step 102) based on the different risk assessment factors 16 of the driver's personal history 14 in accord with one embodiment of the invention. As seen in FIG. 1A, the system 12 of the invention receives the driver's credit score 20 (step 120) and derives a weighted credit score 22 (step 122), wherein said weighted credit score 22 is distinct from an objective driver score 10. In alternate embodiments of the invention, in addition to the driver's credit score 20, the system 12 of the invention may also evaluate additional elements 30, 30' of the driver's credit history 23, e.g. declarations of bankruptcy 24, the driver's debt to equity ratio 25, etc., to derive the weighted credit score 22. If the driver is unaware of his/her credit score 20, the system 12 may obtain the driver's credit score 20 either via an interface with a credit bureau or via a third party service provider upon proper authorization from the driver.

As seen in FIG. 1A, the system 12 of the invention receives the driver's employment history 26 in step 124 to be weighted and scored. A driver's employment history 26, in particular, the current employment status 27 is important to the insurer as it is a good predictor of the driver's ability to pay future insurance premiums. Upon receipt of the driver's employment history 26, the system 12 weighs various elements 30, 30' of the driver's employment history 26, which may include but is not limited to, current employment status 27, number of years employed 28, length of time with current employer 29, number of stints of unemployment 33, duration of unemployment 31, etc., to derive a weighted employment history score 32 (step 126), wherein said weighted employment history score 32 is distinct from an objective driver score 10.

The method also includes the system 12 of the invention receiving the driver's driving record 34 (step 128). Here too, various elements 30, 30' of the driving record 34 are analyzed for insurability. Said elements 30, 30' may include but is not limited to, the number of years since the driver has been licensed 36, any driving suspensions 37, and/or revocations of the driver's license 38, etc. Said elements 30, 30' of the driving record 34 are analyzed and weighted to derive a weighted driving record score 40 (step 130), wherein said weighted driving record score 40 is distinct from an objective driver score 10.

The environment where an individual driver operates or will operate their motor vehicles during an insurance term is an important component in assessing a driver's insurability. Statistics support the premise that most accidents occur on city highways. Even so, the risk of insuring a driver may differ for larger cities because of population density, e.g. insuring a resident of Manhattan may be riskier than a resident of Seattle, Wash. Accordingly, a driver's address history 42 is an important component of the risk assessment factors 16 considered for insurability. Here, the system 12 receives the driver's address history 42 (step 132), analyzes and weighs the driver's address history 42 to derive a weighted address history score 44 (step 134), wherein said weighted address history score 44 is distinct from an objective driver score 10.

In step 136, the system 12 of the invention receives the driver's social security number 46 (step 136) and will verify the driver's identity (step 137, not shown) with the appropriate authorities. Once verified, the system 12 derives a weighted social security score 48 (step 138), wherein said weighted social security score 48 is distinct from an objective driver score 10. If the social security number 46 cannot be verified with the appropriate authorities or it is determined to belong to another individual different from the identified driver, then it is understood that the weighted social security score 48 reflect the discrepancy by being for example a really low weighted social security score 48. According to an embodiment of the invention, the weighted social security score 48 may be disclosed to the potential insurer without disclosing the social security number 46 provided by the driver. However, an insurer analyzing the different elements 30, 30' of an objective driver score 10, can immediately determine from the affected weighted social security score 48 that insuring this driver is risky business. As such the weighted social security score 48 serves as red flag, while still maintaining the confidentiality of the information provided by the driver.

In step 140, the system 12 of the invention receives the driver's insurance history 50 (step 140) where individual elements 30, 30', which includes but is not limited to any one or more of: any lapses in coverage 51, number of claims filed 52, frequency of claims 53, amounts paid for insurance claims on behalf of said driver 54, etc. are analyzed to derive a weighted insurance history score 56 (step 142), wherein said weighted insurance history score 56 is distinct from an objective driver score 10.

Additionally, in step 146 the system 12 receives the driver's accident history 58 (step 144) analyzes the same and derives a weighted accident history score 60 (step 146), wherein said weighted accident history score 60 is distinct from an objective driver score 10. It is understood that if the driver had zero reported accidents, his weighted accident history score 60 will be reflective of the same and may be markedly higher than another driver with one or more reported accidents.

It is also understood that the order of the varied receiving steps for determining the different individual weighted scores 18 derived from the driver's personal history 14 as shown in FIG. 1A may vary. Likewise, the various risk assessment factors 16 of the personal history 14 used to derive individual weighted scores 18 may vary to include or delete other risk assessment factors 16 as more information becomes readily available and verifiable in the future.

Referring back to FIG. 1, once the system 12 receives the driver's personal history 14 (step 100), and derives the individual weighted scores 18 from the varied risk assessment factors 16 in step 102, as explained in FIG. 1A (steps 120-146), the system 12 receives registration of at least one primary vehicle 68 (step 148) that the driver will drive, or intends to operate during the monitoring sessions. The driver will be prompted to confirm whether there are additional drivers (step 150) having access to the registered primary vehicle 68 and if so, to register the other variable parameters 70 associated therewith (step 152), which may include but is not limited to: title 71, vehicle registration number 72 and vehicle identification number 73 for each vehicle being registered, as well as the number of other drivers 79, names 75, ages 76, student status 77 and sex(es) 78 of said other drivers having access to the primary vehicle 68 during the monitoring session.

The system 12 may also prompt the driver to confirm whether the driver will be operating any secondary vehicles 80, 80', 80" (step 154). If so, the driver may register each secondary vehicle 80 where the system 12 receives the registration of the secondary vehicles 80, 80', 80" (step 156) as well as any other variable parameters 70 (step 158) associated therewith. If no secondary vehicles 80 are being registered, the system 12 receives the driver's risk assessment record 82 (step 160) as downloaded by the monitoring unit 84 to the evaluation center 74, where the driver's risk assessment record 82 is recorded and analyzed to derive a weighted driver's risk assessment score 86 (step 164), wherein said weighted driver's risk assessment score 86 is distinct from the objective driver score 10. Once the monitoring sessions are complete, the system 12 generates the objective driver score 10 (step 166) based on the aggregate of the individual weighted scores 18 and the weighted driver's risk assessment score 86. Accordingly, the resulting objective driver score 10 is comprehensive, inclusive of pertinent personal risk assessment factors 16 and driver information that is individualized and specific to the driver.

Figure 2:
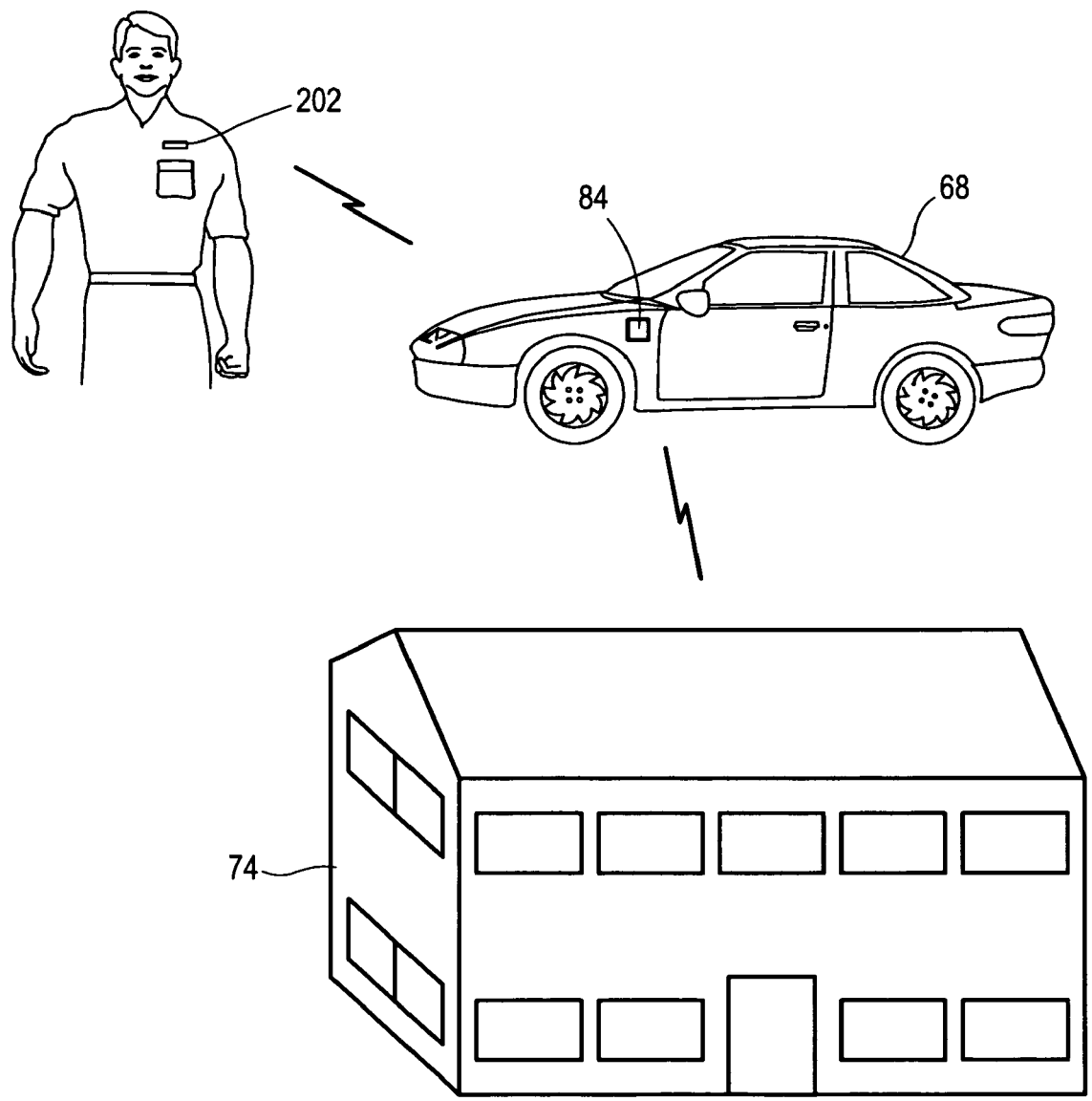
FIG. 2 is an illustrative perspective drawing of a vehicle including certain elements of the invention.

FIG. 2 is an illustrative perspective drawing of a primary vehicle 68 including certain elements of the invention. Each driver being monitored is provided with a portable pin unit 202 with a unique electronic key 204 (not shown), which serves as a unique identifier for the driver, wherein said portable pin unit 202 and electronic key 204 (not shown) are registered in a central electronic database 247 (not shown) at an evaluation center 74, such that solely the activities of the individual driver being assessed is recorded and transmitted to the evaluation center 74. The portable pin unit 202 includes means for selectively activating the monitoring unit 84 in the primary vehicle 68 to start a monitoring session, where upon activation the driver's operation of said primary vehicle 68 and other variable parameters 70 concerning vehicle operation are recorded and reported to an evaluation center 74 to create the driver's risk assessment record 82. The portable pin unit 202 is conveniently small and may be worn on the driver's shirt, lapel, collar, tie, belt, pants or coat pockets, jackets, pocket books, etc. The portable pin unit 202 uses wireless technology, e.g. ZIGBEE, Bluetooth, Radio Frequency Identification ("RFID"), INFRARED, 802.11, Wireless Human Location Network ("WiHLoN") or any other present and future developed wireless communication systems and/or optical communication protocol, to communicate with the monitoring unit 84.

As seen in FIG. 2, the registered primary vehicle 68 is correspondingly equipped with a monitoring unit 84. The monitoring unit 84 has a computer module 208 that interfaces with various vehicular sensors 210 (not shown) to monitor and record the driver's operation of the primary vehicle 68 to create the driver's risk assessment record 82. Said monitoring unit 84 is programmed to identify the driver being monitored via the portable pin unit's 202 unique electronic key 204 upon activation. The monitoring unit 84 transmits its recorded data to the evaluation center 74 via satellite or other wireless communication system, e.g. ZIGBEE, Bluetooth, RFID, INFRARED, 802.11, WiHLoN™ or any other present and future developed wireless communication systems and/or optical communication protocol. The monitoring unit 84 is further provided with a Global Positioning System ("GPS") transponder 206 (not shown) with transmitting means 212 (not shown) for transmitting at least one signal to the evaluation center 74 recording the driver's operation of the primary vehicle 68. The transmitting means 212 may communicate with either a geosynchronous (GEO) or Low Earth Orbit (LEO) satellite in a network. The evaluation center 74 is able to monitor signals received by a communication system 214, which is preferably a satellite system 216 (not shown), from each monitoring device 84.

Figure 2A:
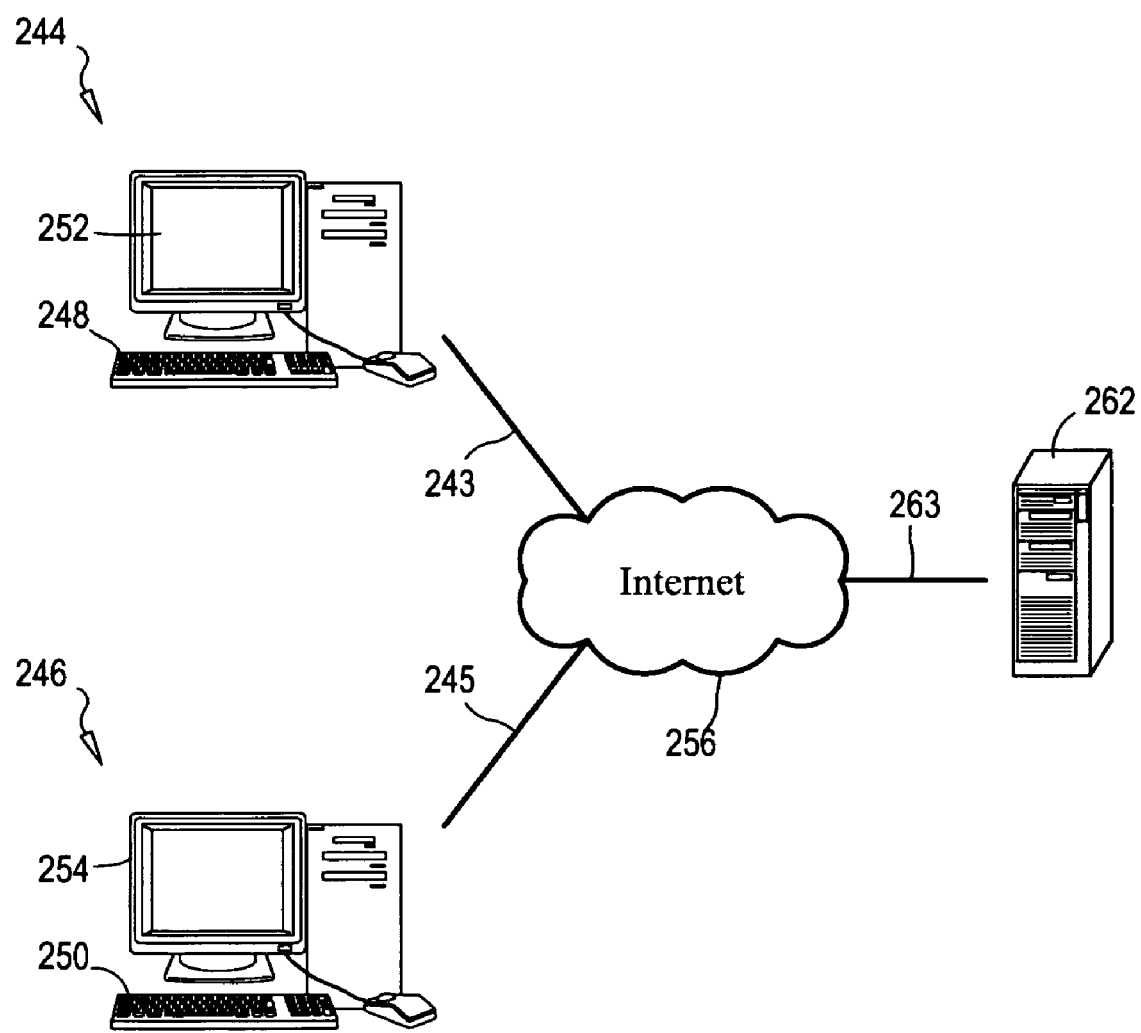
FIG. 2A is network diagram that illustrates an embodiment of the system of the invention.

FIG. 2A is network diagram that illustrates an embodiment of the system of the invention. A driver or insurance provider may access the system 12 of the invention via Internet 256 by way of communication paths 243, 245 using their web access device, e.g. game boy, PDAs, I-Phones, BlackBerry®, smart phones or personal computer 244, 246 which has a keyboard 248, 250 and monitor 252, 254 for entering and displaying information. Drivers and/or insurers may also access the system 12 via an online services network (America Online, Microsoft Network, etc), an interactive television system, a touch-tone telephone interface, e-mail, a telephone-based voice recognition system or other ways of transmitting information now known or developed in the future. When a driver or insurance provider accesses the system 12 via the Internet 256 which is in communications with the server 262, the system 12 of the invention may communicate with the driver or insurance provider via a similar communication path 263 as previously described. Said communication paths 243, 245 may include but is not limited to wireless transmissions, fiber optics, radio frequency transmissions, or any other communication paths that are well known and used in the arts to communicate with the Internet 256.

The server 262 environment of the invention also comprises of an operating system 258 (not shown), a central processor 242 (not shown) and a memory device 260 (not shown) where the central electronic database 247 (not shown) is used to store information concerning each driver, e.g. the driver's personal history information 14, the individual weighted scores 18, the driver risk assessment record 82, the weighted driver risk assessment score 86, the objective driver score 10 and other information and the like, as discussed herein. Access to the electronic database 247 is preferably controlled by the independent third party evaluator, although in appropriate circumstances insurers may be provided with limited direct access to the information.

The memory device 260 may be any computer-readable media such as storage devices, such as a hard drive, a CD-ROM, and/or floppy disk drive, flash drives or any other media devices as used in the arts and may contain instruction code for implementing the system and method as described herein. The central processor 242 (not shown) of the server 262, is in further communications with a central electronic database 247 (not shown) which is a part of the memory device 260 (not shown). The central processor 260 (not shown) is configured to perform the following activities which may include but is not limited to: receiving, transmitting, analyzing, deriving, generating, tabulating, recording and storing data, performing searches, aggregating, determining and outputting, etc. Also, one skilled in the art will appreciate that various communication channels can be used to interconnect the web server and the driver's or insurance provider's personal computer 244, 246 such as the Internet 256, a wide area network, or point-to-point, dial-up connections, cable network, fiber optics, and DSL hi speed connections.

It will be understood that each of the elements described above, or two or more together may also find a useful application in other types of systems and methods differing from the type described above.

While certain novel features of this invention have been shown and described and are pointed out in the annexed claims, it is not intended to be limited to the details above, since it will be understood that various omissions, modifications, substitutions and changes in the forms and details of the system and method describe above and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is:

1. A method of determining a driver score comprising:
   (a) receiving registration of a driver's first or secondary vehicles and personal history, which includes a plurality of risk assessment factors, wherein said risk assessment factors are each analyzed to derive individual weighted scores, and wherein said individual weighted scores are each distinct from an objective driver score used to assess said driver's insurability;

(b) providing each driver with a portable pin unit with a unique electronic key used as a unique identifier for the driver being assessed, and wherein said portable pin unit includes means for selective activation of a monitoring unit in either vehicle to start a monitoring session by monitoring the individual driver's operation of the vehicle in a manner that is independent of the vehicle such that concurrent monitoring of a plurality of drivers of the same vehicle can occur;

(c) equipping at least one vehicle with said monitoring unit, where upon activation the driver's operation of said vehicle and other pertinent-data elements concerning the vehicle are monitored, recorded and transmitted to an evaluation center to generate said driver's risk assessment record;

(d) receiving the driver's risk assessment record which is analyzed to derive a weighted driver risk assessment score, wherein said weighted driver risk assessment score is distinct from the objective driver score; and (e) determining and outputting the objective driver score based on the aggregate of the individual weighted scores derived from the plurality of risk assessment factors and the driver's risk assessment record.

2. The method of claim 1, wherein said driver's personal history includes any one or more of the following: name, age, sex, marital status, and student status.

3. The method of claim 1, wherein said risk assessment factors includes any one or more of the following: credit score, employment history, driving experience, social security number, driving record, address history, insurance history, and the number of outstanding tickets within a predetermined period.

4. The method of claim 1, comprising the step of receiving registration for variable parameters concerning vehicle operation for the monitoring session.

5. The method of claim 4, wherein said variable parameters includes any one or more of the following: title, vehicle registration number for each vehicle being registered, vehicle identification number, number of other drivers, names, ages, sexes, and student status.

6. The method of claim 1, wherein said portable pin unit communicates with the monitoring unit via wireless communication systems.

7. The method of claim 1, wherein said monitoring unit communicates with the evaluation center via wireless communication systems.

8. The method of claims 6 and 7, wherein said wireless communication system includes any one or more of the following: ZIGBEE, Bluetooth, 802.11, INFRARED, Radio Frequency Identification, Wireless Human Location Network, and optical communications.

9. The method of claim 1, further comprising concurrent monitoring of the plurality of drivers for the same vehicle.

10. The method of claim 1, wherein said data elements concerning the vehicle includes any one or more of the following: information regarding the seatbelts, presence of air bags, state of the windshield wipers.

11. A system for determining a driver score comprising:
(a) a portable pin unit;
(b) a memory device; and
(c) a processor disposed in communication with the memory device, the processor configured to:
receive registration of a driver's first or secondary vehicles and personal history which includes a plurality of risk assessment factors, wherein said risk assessment factors are each analyzed to derive individual weighted scores, and wherein said individual weighted scores are each distinct from an objective driver score used to assess said driver's insurability;

(ii) generate said driver's risk assessment record from a driver's operation of said vehicle and other pertinent data elements concerning the vehicle, which are monitored, recorded and transmitted to an evaluation center by a monitoring unit in communication with said portable pin unit, wherein said portable pin unit has a unique electronic key used as a unique identifier for the driver being assessed, and wherein said portable pin unit includes means for selective activation of said monitoring unit in either vehicle to start a monitoring session by monitoring the individual driver's operation of the vehicle in a manner that is independent of the vehicle such that concurrent monitoring of a plurality of drivers of the same vehicle can occur;

(iii) receive the driver's risk assessment record which is analyzed to derive a weighted driver risk assessment score, wherein said weighted driver risk assessment score is distinct from the objective driver score; and (iv) determine and output the objective driver score based on the aggregate of the individual weighted scores derived from the plurality of risk assessment factors and the driver's risk assessment record.

12. The system of claim 11, wherein said driver's personal history includes any one or more of the following: name, age, sex, marital status, and student status.

13. The system of claim 11, wherein said risk assessment factors includes any one or more of the following: credit score, employment history, driving experience, social security number, driving record, address history, insurance history, and the number of outstanding tickets within a predetermined period.

14. The system of claim 11, wherein the processor is further configured to receives registration for variable parameters concerning vehicle operation for the monitoring session.

15. The system of claim 14, wherein said variable parameters includes any one or more of the following: title, vehicle registration number for each vehicle being registered, vehicle identification number, number of other drivers, names, ages, sexes, and student status.

16. The system of claim 11, wherein said portable pin unit communicates with the monitoring unit via wireless communication systems.

17. The system of claim 11, wherein said monitoring unit communicates with the evaluation center via wireless communication systems.

18. The system of claims 16 and 17, wherein said wireless communication system includes any one or more of the following: ZIGBEE, Bluetooth, 802.11, INFRARED, Radio Frequency Identification, Wireless Human Location Network, and optical communications.

19. The system of claim 11, wherein the processor is further configured to concurrently monitor a plurality of drivers for the same vehicle.

20. The system of claim 11, wherein said data elements concerning the vehicle includes any one or more of the following: information regarding the seatbelts, presence of air bags, state of the windshield wipers.

* * * * *